United States Patent
Palat et al.

(10) Patent No.: US 9,392,491 B2
(45) Date of Patent: Jul. 12, 2016

(54) LOAD BALANCING

(71) Applicant: Nokia Technologies Oy, Espoo (FI)

(72) Inventors: Sudeep K. Palat, Swindon (GB); Seau Sian Lim, Swindon (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/388,932

(22) PCT Filed: Mar. 7, 2013

(86) PCT No.: PCT/EP2013/000668
§ 371 (c)(1),
(2) Date: Sep. 29, 2014

(87) PCT Pub. No.: WO2013/143649
PCT Pub. Date: Oct. 3, 2013

(65) Prior Publication Data
US 2015/0094079 A1  Apr. 2, 2015

(30) Foreign Application Priority Data

Mar. 29, 2012 (EP) ..................................... 12360027

(51) Int. Cl.
*H04W 72/00* (2009.01)
*H04W 28/08* (2009.01)
(Continued)

(52) U.S. Cl.
CPC .......... *H04W 28/08* (2013.01); *H04W 28/0215* (2013.01); *H04W 48/04* (2013.01);
(Continued)

(58) Field of Classification Search
CPC ..... H04W 28/08; H04W 48/06; H04W 28/06; H04W 28/18; H04W 36/14; H04W 36/22; H04W 76/027; H04W 28/0215; H04W 48/04; H04W 72/0486

USPC ................................................. 455/433, 450
See application file for complete search history.

(56) References Cited

U.S. PATENT DOCUMENTS 8,180,345 B2  5/2012  Klatt
8,934,339 B2  1/2015  Suzuki et al.
(Continued)

FOREIGN PATENT DOCUMENTS

EP    1 469 698 A2    10/2004
JP    2009-536478 A   10/2009
(Continued)

OTHER PUBLICATIONS

International Search Report for PCT/EP2013/000668 dated Apr. 22, 2013.
(Continued)

*Primary Examiner* — Charles Shedrick
(74) *Attorney, Agent, or Firm* — Harrington & Smith

(57) ABSTRACT

A method of balancing user equipment traffic load between at least two cells supported by a base station in a wireless telecommunication network, a computer program product and network access node operable to perform that method. The method comprising: determining that an operational parameter of at least one of the at least two cells meets criteria indicative of an overload of user equipment traffic; transmitting a link parameter which indicates that establishment of a dedicated communication link with the base station within the at least one cell is unavailable to user equipment operating within the at least one cell without an established dedicated communication link. Aspects allow for early balancing of load within an overloaded network.

21 Claims, 2 Drawing Sheets

(51) Int. Cl.
*H04W 76/02* (2009.01)
*H04W 28/02* (2009.01)
*H04W 48/04* (2009.01)
*H04W 72/04* (2009.01)
*H04W 48/06* (2009.01)
*H04W 28/06* (2009.01)
*H04W 28/18* (2009.01)
*H04W 36/14* (2009.01)
*H04W 36/22* (2009.01)
*H04W 88/02* (2009.01)
*H04W 88/08* (2009.01)

(52) U.S. Cl.
CPC .......... *H04W72/0486* (2013.01); *H04W 76/02* (2013.01); *H04W 76/027* (2013.01); *H04W 28/06* (2013.01); *H04W 28/18* (2013.01); *H04W 36/14* (2013.01); *H04W 36/22* (2013.01); *H04W 48/06* (2013.01); *H04W 88/02* (2013.01); *H04W 88/08* (2013.01)

(56) References Cited

U.S. PATENT DOCUMENTS

| 2006/0128392 | A1 | 6/2006 | Turina et al. |
| 2010/0291941 | A1* | 11/2010 | Chen ............ H04W 36/22 455/450 |
| 2011/0009126 | A1 | 1/2011 | Lee |
| 2011/0244874 | A1 | 10/2011 | Fodor et al. |
| 2012/0020209 | A1 | 1/2012 | Ghosh et al. |

FOREIGN PATENT DOCUMENTS

| JP | 2012-227815 A | 11/2012 |
| JP | 2013-239859 A | 11/2013 |
| JP | 2015-526953 A | 9/2015 |
| WO | WO 2009/025241 A1 | 2/2009 |

OTHER PUBLICATIONS

"Evolved Universal Terrestrial Radio Access (E-UTRA); Radio Resource Control (RRC); Protocol Specification," 3GPP TS 36.331, V11.2.0, Dec. 2012, 3 pages.

* cited by examiner

Example procedure for RRC connection release

LOAD BALANCING

FIELD OF THE INVENTION

The present invention relates to a method of balancing user equipment traffic load between at least two cells supported by a base station in a wireless telecommunication network, a network node operable to perform that method and a computer program product operable to carry out the method.

BACKGROUND

Wireless communications systems are known. In those known systems, radio coverage is provided to user equipment, for example, mobile telephones, by geographical area. An access node, for example, a base station, is located in each geographical area to provide the required radio coverage. User equipment in the area served by a base station receives information from the base station and transmits information and data to the base station.

Information and data transmitted by base stations to user equipment occurs on channels of radio carriers known as downlink carriers. Information and data transmitted by user equipment to base stations occurs on channels of radio carriers known as uplink carriers.

In known single carrier wireless telecommunications systems, user equipment can move between geographical base station coverage areas. Mobility Management Entity (MME) acts as a key control node. The MME is responsible for authenticating user equipment and also operates to select a serving gateway for user equipment and a packet gateway. Those gateways may be of use when user equipment initially attaches to the communications network and when user equipment has data traffic to send to the network. The mobility management entity is also operable to reselect serving gateways at times of handover between base stations.

There are various radio states in which user equipment may operate in a telecommunications network. Once it has synchronised and fully attached to a base station it gains a Radio Resource Control (RRC) connection and is referred to as being in connected mode. User equipment in idle mode does not have an RRC connection.

When an LTE or 4G network is overloaded it is operable to reject fresh RRC connection attempts from user equipment. A base station, for example, e Node B, may also be operable to try and relieve an overloaded network by initiating access class barring. In both cases, user equipment which is camped on within a current cell remains camped on within that cell and is not operable to reselect a different carrier or Radio Access Technology (RAT), even if an alternative carrier or RAT available to it is less loaded.

It is desired to improve the load balancing in an overloaded wireless telecommunications network.

SUMMARY

Accordingly, a first aspect provides a method of balancing user equipment traffic load between at least two cells supported by a base station in a wireless telecommunication network, the method comprising: determining that an operational parameter of at least one of the at least two cells meets criteria indicative of an overload of user equipment traffic; transmitting a link parameter which indicates that establishment of a dedicated communication link with the base station within the at least one cell is unavailable to user equipment operating within the at least one cell without an established dedicated communication link.

The first aspect recognises that when an LTE network is overloaded; that is to say, experiencing high data traffic on the uplink or downlink, it may be operable to reject RRC connection attempts from user equipment. Alternatively, an LTE network may be operable to initiate access class barring methods.

A problem with such a scenario is that user equipment remains camped within a current cell and is not allowed to reselect another carrier or radio access technology, even if the other carrier or radio access technology is less loaded. It will be appreciated that within a network, for example, an LTE or 4G network, legacy radio access technologies may also be available. For example, user equipment and base stations may be operable to support both an LTE network and/or a UMTS or other 3G system. It will be appreciated that in an overloaded LTE network it may be desirable to move user equipment to other less loaded carriers or radio access technologies so that it can receive some service.

Load balancing techniques are known. According to such known techniques, user equipment operating within a network may be provided with a priority list. Such a list is typically used during idle mode typically known as idle mode priority allocation. A priority list is an explicit list assigning a numerical priority value to a carrier or RAT. Such a priority list is typically indicated to user equipment at the same time as issuing an RRC connection release message. It will be appreciated that the information contained in that message, an RRC release, can be sent only after user equipment establishes a connection with a network and that establishment process may involve many signalling messages on an already overloaded network.

Network loads may also be balanced by indicating a priority allocation to user equipment in a system information broadcast from a base station. Such a scenario typically does not work well since any change in priority indicated in a system information broadcast is received by all user equipment in a cell and, thus, all user equipment are operable to move to another carrier or radio access technology.

Loads may also be balanced by using a release message which includes redirection to another radio access technology. It will be appreciated that such a release with redirection to another radio access technology also involves many signalling messages within an already overloaded network. A simple RRC connection rejection message has not been considered previously, since a network (that is to say, a base station known as an eNodeB, MME and associated core network (also known as EUTRAN)) is typically unaware of a given user equipment operational capability; that is to say, it is unaware of which radio access technology or frequency it supports communication with at the time of making a simple RRC connection reject message. In comparison, once an RRC connection has been established, that information may be available to a network.

The first aspect recognises that network load may be balanced according to other methods. In particular, by indicating to user equipment without a dedicated connection operating within a cell, for example, by being camped on in a cell, that a dedicated connection, for example RRC connection, is likely to be unavailable to that user equipment, ameliorative action may be taken by the user equipment and base station to request a dedicated connection in a cell other than that in which it is currently operating. That is to say, The user equipment may initiate a connection to a cell and a base station, based on load information, may then handover the user to another carrier, cell or RAT.

By informing user equipment while it is operating without a dedicated connection within an overloaded cell, subsequent attempts to obtain a dedicated connection by those user equipment may disrupt operation of a network minimally, since user equipment is likely to operate to move any request for a dedicated connection away from the cell or cells which it has received an indication of overload in relation to.

The first aspect particularly addresses the fact that an indication that a cell is unavailable to user equipment due to overloading may be sent before the network is aware of user equipment capabilities. The benefit of indicating a lower priority to an overloaded cell in a reject message is that a base station need not know user equipment capability at the time of doing so. The user equipment is then operable to automatically select the next highest priority RAT or carrier or cell according to its capability and priorities.

It will be appreciated that whilst reference is made to cells being supported by a single base station the at least two cells may, according to some embodiments, be controlled by different base stations, in particular, different eNode Bs in an LTE network, or different base stations or RNCs in a UMTS network.

In one embodiment, the transmission comprises a response to a request from user equipment for a dedicated communication link with said base station within the at least one cell. Accordingly, early in a procedure for obtaining a dedicated connection within a given cell, user equipment is informed that connection with that cell is unlikely.

In one embodiment, the response comprises a rejection of the request from user equipment for a dedicated communication link. Accordingly, by including an indication in the reject message that the cell is likely to be unavailable to support new requests for dedicated communications links, rather than repeating a request for a dedicated link within the same cell until a link is eventually established (each request causing more traffic in an already overloaded cell), user equipment may take actions to prevent such a scenario. It may, for example, wait a period of time before re-requesting a dedicated link. It may take unilateral actions, once a link parameter has been received, to find a new cell, carrier or RAT to use to transmit data traffic to the network.

In one embodiment, the transmission comprises a broadcast message to a proportion of the user equipment operating within the at least one cell. Accordingly, rather than informing all user equipment in a cell that the cell is busy, thereby causing all user equipment to try and find a new cell for communication with the network, a proportion of user equipment may be addressed in a system information broadcast message. That proportion of user equipment may comprise a proportion of all user equipment within a cell, active user equipment within a cell or idle user equipment within a cell.

In one embodiment, the link parameter comprises an instruction to lower a connection establishment priority parameter associated with the at least one cell. Accordingly, by lowering a cell or carrier priority, user equipment are more likely to select an alternative cell or carrier for dedicated signalling to the network. In conjunction with, or as an alternative to, a priority parameter associated with all other cells may be increased, thereby increasing the likelihood that an alternative cell or carrier will be selected as a candidate for dedicated signalling by user equipment.

In one embodiment, the link parameter comprises an indication to user equipment to attempt establishment of a dedicated communication link with the base station in a cell other than the at least one unavailable cell. Accordingly, if user equipment is able to communicate with a network using a carrier, cell or RAT other than that used in the overloaded cell, it may be operable, once a link parameter has been received, to unilaterally implement such communication. In some embodiments, the link parameter may comprise an indication of a preferred alternative carrier, cell or RAT.

In one embodiment, the at least two cells supported by a base station comprise cells operating according to at least two radio access technologies. Accordingly, a base station may be operable to support communication with legacy user equipment, operating according to older wireless techniques. For example, a single physical base station may support antenna which can communicate according to an LTE protocol, a UMTS protocol and similar.

In one embodiment, the link parameter comprises an instruction to user equipment to request a dedicated communication link on one of the at least two cells operating according to a different radio access technology to the at least one cell. Accordingly, the parameter may indicate to user equipment a preferred alternative RAT, or indicate a disadvantageous or undesirable RAT in order to relieve an overloaded cell.

In one embodiment, the link parameter comprises an indication of a time period for which establishment of a dedicated communication link with the base station within the at least one cell is unavailable to user equipment. Accordingly, by implementing a wait timer, the method is operable to prevent user equipment from "ping-ponging" back immediately to a currently allocated radio link carrier, cell or RAT. Such a wait timer is operable to ensure that normal operation, for example, normal, or previously indicated priorities, carriers, cells or RATs are applicable after expiry of the wait timer.

A second aspect provides a computer program product operable, when executed on a computer, to perform the method of the first aspect.

A third aspect provides a network access node operable to balance user equipment traffic load between at least two cells supported by a base station in a wireless telecommunication network, the network access node comprising:
determination logic operable to determine that an operational parameter of at least one of the at least two cells meets criteria indicative of an overload of user equipment traffic;
transmission logic operable to transmit a link parameter which indicates that establishment of a dedicated communication link with the base station within the at least one cell is unavailable to user equipment operating within the at least one cell without an established dedicated communication link.

According to one embodiment, the transmission logic is operable to transmit a response to a request from user equipment for a dedicated communication link with the base station within the at least one cell.

According to one embodiment, the response comprises a rejection of the request from user equipment for a dedicated communication link.

According to one embodiment, the transmission logic is operable to transmit a broadcast message to a proportion of the user equipment operating within the at least one cell.

According to one embodiment, the link parameter comprises an instruction to lower a connection establishment priority parameter associated with the at least one cell.

According to one embodiment, the link parameter comprises an indication to user equipment to attempt establishment of a dedicated communication link with the base station in a cell other than the at least one unavailable cell.

According to one embodiment, the at least two cells supported by a base station comprise cells operating according to at least two radio access technologies.

According to one embodiment, the link parameter comprises an instruction to user equipment to request a dedicated communication link on one of the at least two cells operating according to a different radio access technology to the at least one cell.

According to one embodiment, the link parameter comprises an indication of a time period for which establishment of a dedicated communication link with the base station within the at least one cell is unavailable to user equipment.

Further particular and preferred aspects of the present invention are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further with reference to the accompanying drawings, in which.

DESCRIPTION OF THE EMBODIMENTS

Figure 1:
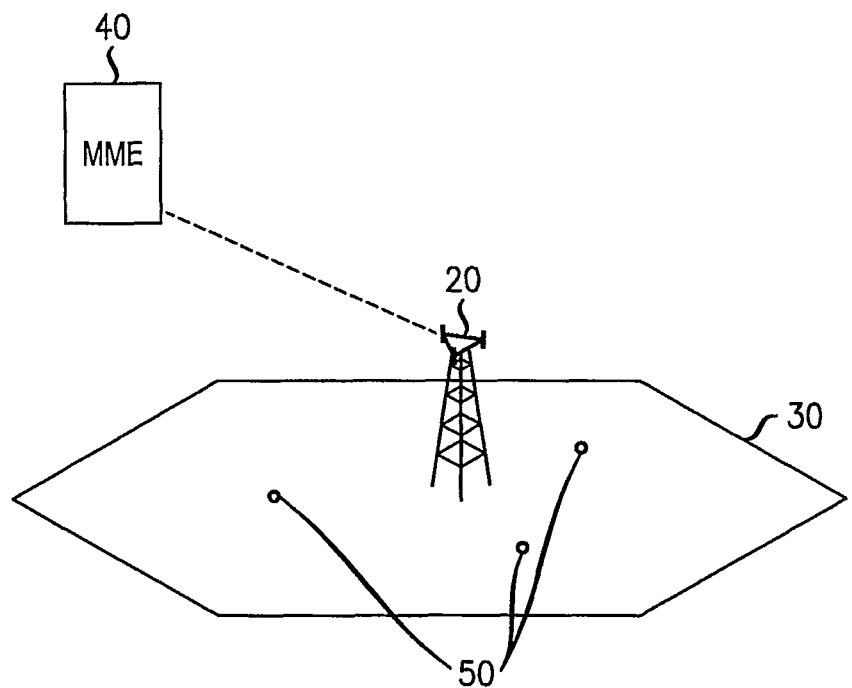
FIG. 1 illustrates the main components of a telecommunications network according to one embodiment.

FIG. 1 illustrates a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 20, communications may be established between a user equipment and the base station over associated radio links. Each base station typically supports a number of sectors within the geographical area of service 30.

Typically, a different antenna within a base station supports each associated sector. Accordingly, each base station 20 has multiple antennas and signals sent through the different antennas which are electronically weighted to provide a sectorised approach. Of course, it will be appreciated that FIG. 1 illustrates a small sub-set of the total number of user equipment and base stations that may be present in a typical communications system.

The wireless communications system is managed by a Mobility Management Entity (MME). The MME 40 controls operation of the wireless communications system by communicating with a plurality of base stations. The MME also communicates with user equipment 50 via each base station and, thus, effectively manages the wireless communication system.

The MME is also connected to a serving gateway and a packet gateway. The serving gateway and packet gateway determine which base station is operable to provide user equipment with service and the routing of data traffic to and from user equipment.

User equipment 50 typically transmits information and data to a base station 20 so that it can be re-routed within a wireless telecommunications network. User equipment may, for example, need to transmit data to the base station in order to relay text messages, voice information when a user is using the equipment to make a telephone call, or other data. Base station 20, in combination with parameters set by an MME 40, allocates resource to user equipment in a manner that aims to optimize operation of a wireless telecommunications network 10.

A radio link is a dedicated connection between user equipment 50 and a cell of a base station. Such dedicated radio links are formed when user equipment is in an RRC connected state. When user equipment is not transmitting information such as text messages or voice information to a base station, it is in a so-called RRC idle state. When user equipment has information to transmit to a base station, it chooses a connected state within which to operate. When in that RRC connected state, user equipment is able to use high speed uplink packet access radio resources to achieve a high uplink throughput.

User equipment has uplink and downlink radio links. When a downlink (a connection between a base station and user equipment) radio link failure occurs, user equipment may declare a radio link failure and may move away from an RRC connected state. More particularly, it may move away from a state in which it has the ability to operate in high speed uplink packet access mode.

When user equipment has data and information to transmit to a base station it makes a request to move to an RRC connected state.

When an LTE network is overloaded; that is to say, experiencing high data traffic on the uplink or downlink, it may be operable to reject RRC connection attempts from user equipment. Alternatively, an LTE network may be operable to initiate access class barring methods.

A problem with such a scenario is that user equipment remains camped within a current cell and is not allowed to reselect another carrier or radio access technology, even if the other carrier or radio access technology is less loaded. It will be appreciated that within a network, for example, an LTE or 4G network, legacy radio access technologies may also be available. For example, user equipment and base stations may be operable to support both an LTE network and/or a UMTS or other 3G system. It will be appreciated that in an overloaded LTE network it may be desirable to move user equipment to other less loaded carriers or radio access technologies so that it can receive some service.

Load balancing techniques are known. According to such known techniques, user equipment operating within a network may be provided with a priority list. Such a list is typically used during idle mode typically known as idle mode priority allocation. Such a priority list is typically indicated to user equipment at the same time as issuing an RRC connection release message. It will be appreciated that the information contained in that message, an RRC release, can be sent only after user equipment establishes a connection with a network and that establishment process may involve many signalling messages on an already overloaded network.

Network loads may also be balanced by indicating a priority allocation to user equipment in a system information broadcast from a base station. Such a scenario typically does not work well since any change in priority indicated in a system information broadcast is received by all user equipment in a cell and, thus, all user equipment are operable to move to another carrier or radio access technology.

Loads may also be balanced by using a release message which includes redirection to another radio access technology. It will be appreciated that such a release with redirection to another radio access technology also involves many signalling messages within an already overloaded network. A simple RRC connection rejection message has not been considered previously, since a network (that is to say, a base station, MME and associated core network (also known as EUTRAN)) is typically unaware of a given user equipment operational capability; that is to say, it is unaware of which radio access technology or frequency it supports communication with at the time of making a simple RRC connection reject message. In comparison, once an RRC connection has been established, that information may be available to a network.

Figure 2:
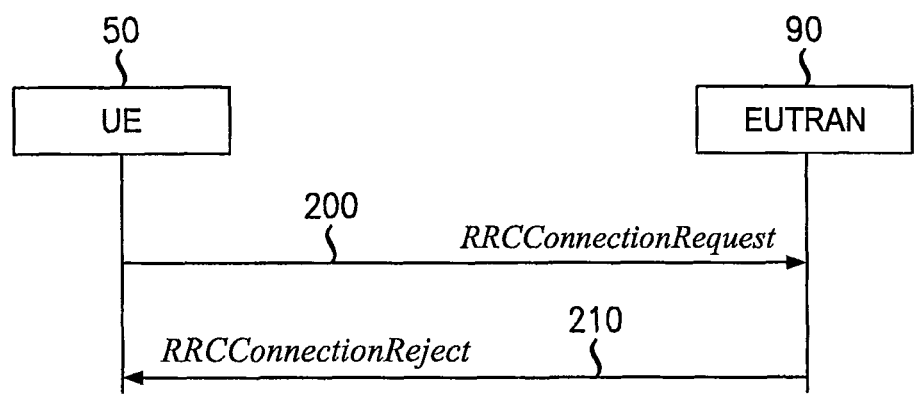
FIG. 2 is a signalling diagram illustrating a typical RRC connection procedure.

FIG. 2 is a signalling diagram illustrating a typical RRC connection procedure. If user equipment 50 determines that it has data traffic to send to the network, it makes an RRC connection request indicated as 200. The network 90 is operable to determine that it is overloaded and sends an RRC connection reject message 210 back to user equipment 50.

Figure 3:
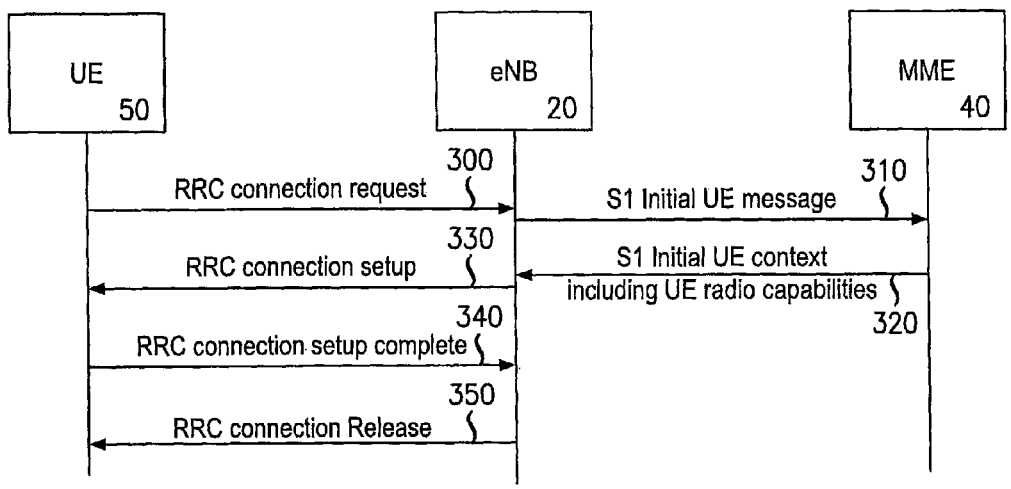
FIG. 3 is a signalling diagram illustrating a typical release procedure.

FIG. 3 is a signalling diagram illustrating a typical release procedure. If user equipment 50 has data traffic to send to a network, it transmits an RRC connection request 300 to base station 20. That base station relays relevant information received from user equipment 50 in an S1 initial user equipment message 310 to Mobility Management Entity 40. That MME 40 deciphers information contained in message 310 and responds to base station 20 with an S1 initial user equipment context message which includes an indication of user equipment radio capabilities. That message 320 is relayed from MME 40 to base station 20. Base station 20 is operable to send an RRC connection set-up message 330 to user equipment 50 and user equipment 50 responds with an RRC connection set-up complete message 340. When a base station determines that the RRC connection of user equipment is to be terminated it transmits an RRC connection release message 350 to user equipment 50.

Aspects described herein recognise that network load may be balanced according to other methods. According to one embodiment, an option to signal to user equipment in an RRC reject message is introduced. Such signalling in the RRC reject message may include an indication to user equipment to lower the priority of the current carrier being used by the user equipment.

In other embodiments, a broadcast parameter may be used to temporarily amend the priority of an existing carrier or current carrier used by user equipment to a lower priority. According to one embodiment, such a lowered priority broadcast message may be used in relation to a fraction of users within a cell.

In one embodiment, a rejection message may be sent to user equipment and a user equipment may be requested, at the same time as a rejection is sent, to select any other carrier available according to its operational capabilities. According to some embodiments, no explicit carrier indication is provided in that request message.

In some embodiments, a timer is provided according to which a lowering of priority of a carrier or an indication to select another Radio Access Technology is indicated to user equipment for a predetermined time period.

Figure 4:
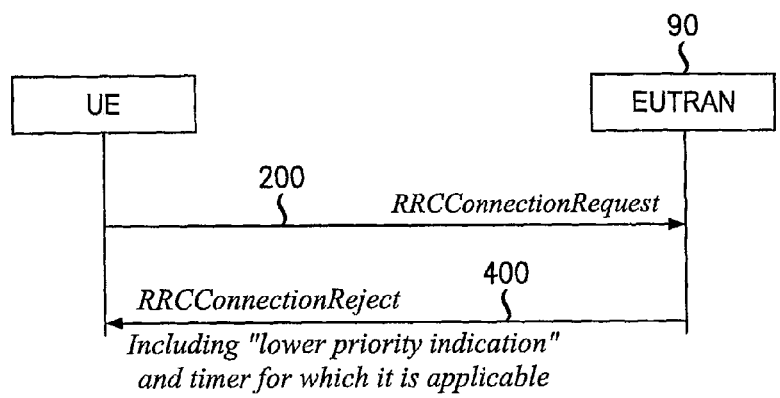
FIG. 4 is a signalling diagram illustrating an RRC connection procedure according to one embodiment.

FIG. 4 is a signalling diagram illustrating an RRC connection procedure according to one embodiment. According to the embodiment shown in FIG. 4, user equipment 50 is operable to send an RRC connection request 200 to the LTE network 90. The network 90 is operable to transmit to user equipment an RRC connection reject message 400 including a lower priority indication and timer for which that lower priority indication is applicable.

According to one embodiment, when user equipment receives an RRC connection reject message including an indication of lower priority for the current cell, the user equipment is operable to perform a carrier reselection. According to that reselection, user equipment is operable to choose a different carrier since the current carrier has been indicated by the network to be of a lower priority.

According to embodiments in which a timer is also indicated to user equipment in an RRC connection reject message, the wait timer is operable to prevent user equipment from "ping-ponging" back immediately to a currently allocated radio link carrier. Such a wait timer is operable to ensure that normal priorities are applicable after expiry of the wait timer.

It will be appreciated that according to some embodiments there is no need for a network to know user equipment capabilities at the time of sending an RRC connection reject message. Load balancing within a network may be controlled since only user equipment which are sent RRC reject messages are moved to another carrier.

It will be appreciated that embodiments require minimal changes to existing network specifications and may be operable to achieve a load balancing or load distribution by re-using existing models for reselection priorities.

Embodiments described including timers may be operable to ensure that there is a lower risk of ping-pong between available carriers. Furthermore, embodiments described reduce network load early in a connection establishment phase without increase in network signalling.

It will be appreciated that a person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its scope as defined by the claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method comprising:
   load balancing between cells in a wireless telecommunication network, comprising:
   determining at a network access node that an operational parameter of a cell of said cells meets criteria indicative of overload within said cell;
   transmitting from said network access node a radio resource control connection rejection message in response to a request from user equipment for a dedicated communication link within said cell, said radio resource control connection rejection message comprising a link parameter which indicates that establishment of a dedicated communication link within said cell is unavailable to user equipment operating within said cell, said link parameter comprising an instruction to lower a connection establishment priority parameter associated with said cell;
   wherein said radio resource control connection rejection message comprises a priority list assigning a lower connection priority to at least one of a carrier and radio access technology of the wireless telecommunication network, and wherein said lower connection establishment priority associated with said cell is indicated in said priority list.

2. The method according to claim 1, wherein said link parameter comprises an indication to said user equipment requesting a dedicated communication link to attempt establishment of a dedicated communication link with a base station in a cell other than the at least one unavailable cell.

3. The method according to claim 1, wherein said cells supported by at least one base station comprise cells operating according to at least two radio access technologies.

4. The method according to claim 3, wherein said link parameter comprises an instruction to said user equipment to request a dedicated communication link on one of said cells operating according to a different radio access technology to said cell.

5. The method according to claim 1, wherein said link parameter comprises an indication of a time period for which establishment of a dedicated communication link with said base station within said cell is unavailable to said user equipment requesting a dedicated communication link within said cell.

6. A non-transient computer program readable medium carrying instructions which when executed by said network access node cause said network access node to perform the method of claim 1.

7. The method according to claim 1,
   in which said load balancing between cells is balancing user equipment traffic load between at least two cells supported by at least one base station;
   in which said determining is determining at said network access node that said operational parameter of at least one of said at least two cells meets criteria indicative of said overload of user equipment traffic within said at least one cell;
   in which said transmitting is transmitting from said network access node said radio resource control connection rejection message in response to said request from said user equipment for said dedicated communication link with said base station within said at least one cell, said radio resource control connection rejection message comprising said link parameter which indicates that establishment of said dedicated communication link with said base station within said at least one cell is unavailable to user equipment operating within said at least one cell; and
   in which said instruction is to lower said connection establishment priority parameter associated with said at least one cell.

8. The method according to claim 1, wherein said lowered connection establishment priority parameter comprises an indication to user equipment that the current carrier is of a lower priority.

9. A network access node comprising:
   at least one processor: and
   at least one memory including computer program code, where the at least one memory and the computer program code are configured, with the at least one processor, to cause the network access node to at least:
   load balance between cells in a wireless telecommunication network, said network access node comprising:
   determining that an operational parameter of a cell of said cells meets criteria indicative of an overload within said cell; and transmitting a radio resource control connection rejection message in response to a request from user equipment for a dedicated communication link within said cell, said radio resource control connection rejection message comprising a link parameter which indicates that establishment of a dedicated communication link within said cell is unavailable to user equipment operating within said at least one cell, said link parameter comprising an instruction to lower a connection establishment priority parameter associated with said cell; wherein said radio resource control connection rejection message comprises a priority list assigning a lower connection priority to at least one of a carrier and radio access technology of the wireless telecommunication network, and wherein said lower connection establishment priority associated with said cell is indicated in said priority list.

10. The method according to claim 1, wherein said cells are supported by a single base station.

11. The method according to claim 1, wherein said link parameter comprises: an indication of a time period for which said cell has said lower connection establishment priority parameter.

12. The network access node according to claim 9, wherein said cells are supported by a single base station.

13. A network access node according to claim 9, in which the at least one memory including the computer program code is configured with the at least one processor to cause said network access node to:

load balance user equipment traffic load between at least two cells supported by at least one base station;

determine that said operational parameter of at least one of said at least two cells meets criteria indicative of said overload of user equipment traffic within said at least one cell;

transmit said radio resource control connection rejection message in response to said request from said user equipment for said dedicated communication link with said base station within said at least one cell; and wherein said radio resource control connection rejection message comprises said link parameter which indicates that establishment of said dedicated communication link with said base station within said at least one cell is unavailable to user equipment operating within said at least one cell, and said instruction is to lower said connection establishment priority parameter associated with said at least one cell.

14. A user equipment comprising:

at least one processor: and at least one memory including computer program code, where the at least one memory and the computer program code are configured, with the at least one processor, to cause the user equipment to at least:

assist in load balancing between cells in a wireless telecommunication network, comprising:

requesting a dedicated communication link with a cell of said cells; and receiving a radio resource control connection rejection message comprising a link parameter which indicates that establishment of said dedicated communication link within said cell is unavailable to said user equipment operating within said cell, said link parameter comprising an instruction to lower a connection establishment priority parameter associated with said cell; wherein said radio resource control connection rejection message comprises a priority list assigning a lower connection priority to at least one of a carrier and radio access technology of the wireless telecommunication network, and wherein said lower connection establishment priority associated with said cell is indicated in said priority list.

15. The user equipment according to claim 14 in which said load balancing is of user equipment traffic load between at least two cells supported by at least one base station and wherein said at least one memory including the computer program code is configured with the at least one processor to cause the user equipment to:

request said dedicated communication link with said base station within said at least one cell, said reception logic; and receive said radio resource control connection rejection message comprising said link parameter which indicates that establishment of said dedicated communication link with said base station within said at least one cell is unavailable to said user equipment operating within said at least one cell, said link parameter comprising said instruction to lower said connection establishment priority parameter associated with said at least one cell.

16. The user equipment according to claim 14, wherein the lowered connection establishment priority parameter comprises an indication to said user equipment that the current carrier is of a lower priority.

17. The user equipment according to claim 14, wherein said at least one memory including the computer program code is configured with the at least one processor to cause said user equipment to take unilateral action, once said lowered link parameter has been received, to find a new cell, carrier, or Radio Access Technology of a next higher priority to use to transmit data traffic to said network according to a capability and priority of the user equipment.

18. The user equipment according to claim 17, wherein said at least one memory including the computer program code is configured with the at least one processor to cause said user equipment to request a communication link having automatically selected the next highest priority Radio Access Technology or carrier or cell according to said user equipment capability and priorities.

19. The user equipment according to claim 14, wherein said at least one memory including the computer program code is configured with the at least one processor to cause said user equipment to, after receiving said instruction to lower said connection establishment priority parameter, select an alternative cell, carrier or Radio Access Technology of a next higher priority for dedicated signaling to said network according to a capability and priority of the user equipment.

20. The user equipment according to claim 19, wherein said at least one memory including the computer program code is configured with the at least one processor to cause said user equipment to request a communication link having automatically selected the next highest priority Radio Access Technology or carrier or cell according to said user equipment capability and priorities.

21. The user equipment according to claim 14, wherein said at least one memory including the computer program code is configured with the at least one processor to cause said user equipment, after receiving said link parameter, said link parameter comprising an indication to said user equipment to attempt establishment of said dedicated communication link with said base station in a cell other than said at least one unavailable cell, to unilaterally implement communication with said network using a carrier, cell or Radio Access Technology other than that used in said overloaded cell.

* * * * *